(12) United States Patent
Ströbel et al.

(10) Patent No.: US 11,361,880 B2
(45) Date of Patent: Jun. 14, 2022

(54) CABLE HOLDER FOR STORING UNUSED CORES OF A MULTICORE CABLE

(71) Applicant: ebm-papst Mulfingen GmbH & Co. KG, Mulfingen (DE)

(72) Inventors: Othmar Ströbel, Schrozberg (DE); Christian Zeller, Ailringen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 16/751,253

(22) Filed: Jan. 24, 2020

(65) Prior Publication Data

US 2020/0243215 A1 Jul. 30, 2020

(30) Foreign Application Priority Data

Jan. 25, 2019 (DE) .................... 10 2019 101 936.2

(51) Int. Cl.
*H01B 7/00* (2006.01)
*H01B 17/30* (2006.01)
(Continued)

(52) U.S. Cl.
CPC ........... *H01B 7/0009* (2013.01); *H01B 17/30* (2013.01); *H01B 17/38* (2013.01); *G02B 6/02042* (2013.01); *H02G 1/12* (2013.01)

(58) Field of Classification Search
CPC .... G02B 6/02042; H01B 17/30; H01B 17/38; H01B 7/0009; H02G 15/04; H02G 1/12; H02G 3/32; F16L 3/02; F16L 3/06; F16L 3/08; F16L 3/10; F16L 3/12; F16L 3/22; F16L 3/26; F16L 3/2235; F16L 3/227; F16L 3/23; F16L 3/00
See application file for complete search history.

(56) References Cited

U.S. PATENT DOCUMENTS 3,913,187 A * 10/1975 Okuda ...................... F16L 3/12
24/484
4,244,544 A * 1/1981 Kornat ...................... F16L 3/13
248/68.1
(Continued)

FOREIGN PATENT DOCUMENTS

DE    35 35 857 A1    4/1987
DE   100 22 547 A1   11/2001
(Continued)

OTHER PUBLICATIONS

German Search Report dated Nov. 6, 2019 in corresponding German Application No. 10 2019 101 936.2.

*Primary Examiner* — William H. Mayo, III
*Assistant Examiner* — Rhadames Alonzo Miller
(74) *Attorney, Agent, or Firm* — Harness, Dickey & Pierce, P.L.C.

(57) ABSTRACT

A cable holder (10) attaches to a cable (1) with a plurality of cores (2). The cable holder (10) has a receiving body (11) with a plurality of receiving chambers (12). The chambers (12) extend in a cable longitudinal direction (L). An insertion opening (13) is formed at least on one side of the receiving chamber for inserting an end of a core (2). A fastening portion (14) is connected to the receiving chamber (12). The fastening portion (14) fastens the cable holder (10) to the outer sheath of the cable (1) by a fastening device (3) engaging around the cable (1).

10 Claims, 2 Drawing Sheets

(51) Int. Cl.
*H01B 17/38* (2006.01)
*G02B 6/02* (2006.01)
*H02G 1/12* (2006.01)

(56) References Cited

U.S. PATENT DOCUMENTS

| | | | |
|---|---|---|---|
| D269,851 S * | 7/1983 | Kimura | D8/356 |
| 5,035,383 A * | 7/1991 | Rainville | H02G 3/26 |
| | | | 248/68.1 |
| 5,042,114 A * | 8/1991 | Parrish | F16L 3/233 |
| | | | 24/16 PB |
| 5,225,648 A * | 7/1993 | Torii | B23K 26/0884 |
| | | | 219/121.6 |
| 5,316,246 A * | 5/1994 | Scott | A61M 5/1418 |
| | | | 248/68.1 |
| D425,987 S * | 5/2000 | Goldstein | D24/128 |
| 6,109,569 A * | 8/2000 | Sakaida | F16L 3/222 |
| | | | 248/316.7 |
| 6,206,330 B1 * | 3/2001 | Oi | F16B 37/0842 |
| | | | 248/635 |
| 6,227,502 B1 * | 5/2001 | Derman | F16L 3/2235 |
| | | | 248/68.1 |
| 6,360,051 B1 * | 3/2002 | Daoud | G02B 6/3801 |
| | | | 385/134 |
| D512,905 S * | 12/2005 | Byers | D8/382 |
| 7,172,162 B2 * | 2/2007 | Mizukoshi | B60H 1/00557 |
| | | | 248/49 |
| 7,478,783 B2 * | 1/2009 | Royer | F16L 3/223 |
| | | | 248/49 |
| 7,514,630 B2 * | 4/2009 | Anderson | H02G 3/30 |
| | | | 174/135 |
| 7,766,285 B2 * | 8/2010 | Cox | F16L 3/1233 |
| | | | 248/74.2 |
| 8,020,811 B2 * | 9/2011 | Nelson | F16L 3/2235 |
| | | | 248/68.1 |
| 8,245,733 B2 * | 8/2012 | Renaud | F02M 35/10137 |
| | | | 138/106 |
| 8,590,847 B2 * | 11/2013 | Guthke | H02G 3/32 |
| | | | 248/68.1 |
| 8,894,022 B2 * | 11/2014 | Chirpich | F16L 3/137 |
| | | | 248/74.3 |
| D747,276 S * | 1/2016 | Rodrigue | D13/155 |
| D774,002 S * | 12/2016 | Hsieh | D13/155 |
| D834,923 S * | 12/2018 | Chrouser | D8/356 |
| D835,975 S * | 12/2018 | Putnam, Jr. | D8/356 |
| 2002/0084388 A1 * | 7/2002 | Geiger | F16L 3/233 |
| | | | 248/74.3 |
| 2003/0173470 A1 * | 9/2003 | Geiger | F16L 55/035 |
| | | | 248/55 |
| 2005/0121559 A1 * | 6/2005 | King | F16L 3/085 |
| | | | 248/68.1 |
| 2005/0189453 A1 * | 9/2005 | DeGuevara | H02G 3/305 |
| | | | 248/68.1 |
| 2007/0120023 A1 * | 5/2007 | Martinez | F16L 3/22 |
| | | | 248/75 |
| 2007/0187555 A1 * | 8/2007 | Rabanin | F16L 3/085 |
| | | | 248/49 |
| 2007/0235597 A1 * | 10/2007 | Winchester | F16L 3/223 |
| | | | 248/68.1 |
| 2009/0050350 A1 * | 2/2009 | Katsumata | H02G 3/0691 |
| | | | 174/135 |
| 2009/0065249 A1 * | 3/2009 | Silvers | H02G 3/30 |
| | | | 174/72 A |
| 2010/0186197 A1 * | 7/2010 | Inomata | F16L 3/233 |
| | | | 24/16 R |
| 2010/0258685 A1 * | 10/2010 | Gardner | F16L 3/23 |
| | | | 248/68.1 |
| 2011/0147542 A1 * | 6/2011 | Hoek | F16L 3/223 |
| | | | 248/68.1 |
| 2012/0292460 A1 * | 11/2012 | Hsu | H02G 7/053 |
| | | | 248/70 |
| 2012/0298404 A1 * | 11/2012 | Tokunaga | H02G 3/0487 |
| | | | 174/135 |
| 2013/0175407 A1 * | 7/2013 | Williams | F16L 3/223 |
| | | | 248/68.1 |
| 2013/0187012 A1 * | 7/2013 | Blakeley | H02G 3/32 |
| | | | 248/68.1 |
| 2013/0233597 A1 * | 9/2013 | Suiter | H02G 1/00 |
| | | | 174/135 |
| 2013/0248245 A1 * | 9/2013 | Park | G21B 1/17 |
| | | | 174/650 |
| 2014/0166825 A1 * | 6/2014 | Shiga | B60R 16/0215 |
| | | | 248/74.2 |
| 2014/0259620 A1 * | 9/2014 | Hicks | F16L 3/223 |
| | | | 29/525.01 |
| 2015/0144394 A1 * | 5/2015 | Webb | H02G 15/113 |
| | | | 174/658 |
| 2016/0284440 A1 * | 9/2016 | Adachi | H02G 3/0691 |
| 2017/0002958 A1 * | 1/2017 | Harnetiaux | F16L 3/223 |
| 2017/0260815 A1 * | 9/2017 | Levie | E21B 19/16 |
| 2018/0366926 A1 * | 12/2018 | Schulte | F16L 3/127 |
| 2019/0036317 A1 * | 1/2019 | Okuhara | H01B 17/26 |
| 2019/0285201 A1 * | 9/2019 | Ruiz | F16L 3/2235 |
| 2020/0141518 A1 * | 5/2020 | Nakano | B60R 16/0207 |
| 2020/0406840 A1 * | 12/2020 | Egami | H02G 3/30 |

FOREIGN PATENT DOCUMENTS

DE 10022547 A1 * 11/2001 ............... H01R 9/03
WO WO-2007/118548 A1 10/2007

* cited by examiner

CABLE HOLDER FOR STORING UNUSED CORES OF A MULTICORE CABLE

CROSS-REFERENCE TO RELATED APPLICATION

This application claims priority to German Application No. 10 2019 101 936.2, filed Jan. 25, 2019. The disclosure of the above application is incorporated herein by reference.

FIELD

The disclosure relates to a cable holder, in particular, for storing unused cores of a multicore cable.

BACKGROUND

A cable describes a sheathed electrical wire. A cable can also be a group of several strands, insulated wires or cores. A single conductor with its insulation is referred to as a core or core wire. Cores are current-carrying wires or strands or even the single conductor of a cable.

The present disclosure relates to a cable holder for a multicore cable. Also, to a cable where there are several cores that are preferably disposed in a common cable sheath. The disclosure further relates to a cable having such a cable holder.

In the case of electrical wiring, multicore cables are regularly laid that have only some or initially only some of the existing cores used for connecting or providing specific electrical functions for an application. The further unused or initially unused cores are not used or only later used in subsequent assembly.

If, for example, a 5-wire cable is used to connect a device operated with single phase, 3 cores would be required. Two of the cores would remain free of connection and without any function. Such superfluous cores are managed in various ways in the prior art. In some cases, the cores are simply pinched or clipped at the end of the stripped cable sheath. This can lead to problems with respect to electrical application. In other measures the superfluous core ends are insulated using an insulating element. They are then wound around the cable. If these cores are required again in a later assembly step, dismantling is involved. Thus, there is the risk that the core end will have been previously damaged or improperly handled.

According to an alternative solution, the free cores are folded back and then sheathed, for example, with a shrink tube. In the prior art, however, there is no satisfactory, reliable and useful device or method for how to manage (initially) unused core wires.

SUMMARY

The disclosure therefore addresses the problem of avoiding the aforesaid disadvantages. It proposes a solution that allows a reliable, space-saving and cost-effective assembly option for (initially) unused cores or core wires of a cable.

This problem is solved by the combination of features according to a cable holder attached to a cable having a plurality of cores. The cable holder comprises a receiving body with a plurality of receiving chambers. The chambers extend in a cable direction of longitudinal extension (L). An insertion opening is at least on one side of each chamber inserting an end of a core. A fastening portion connects to the receiving body. The fastening portion fastens the cable holder to the outer sheath of the cable by a fastening device that engages around the cable.

A basic concept of the disclosure provides a cable holder that can be detachably fastened to a multicore cable. It is designed in such a way that it can hold the unused core ends reliably and simply by insertion mounting. Also, the unused cores can be stored securely in their positions until they are either wired in a later assembly step or, if necessary, they can remain permanently in this storage position.

According to the disclosure, a cable holder is proposed for attaching to a cable, including a plurality of cores. The cable holder comprises a receiving body with a plurality of receiving chambers. The chambers extend in a cable longitudinal direction. The chambers have an insertion opening at least on one side for inserting an end of a core. A fastening portion is connected to the receiving chamber. The fastening portion fastens the cable holder to the outer sheath of the cable by a fastening device engaging around the cable.

In an advantageous embodiment of the disclosure, the fastening portion extends away from the receiving body in the cable longitudinal direction. As a result, it can particularly advantageously bear against and be easily mounted on a cable. The receiving chambers, in the mounted state, likewise extend in this direction. The folded-back cores, to be inserted into the receiving chambers, can be easily aligned and introduced into the chambers.

It is further advantageous if the insertion opening is located on an end face portion of the receiving body facing in the direction of the fastening portion. This further facilitates ease of mounting.

In a likewise advantageous embodiment of the disclosure, the receiving body, on the side facing the cable, has a contact surface that is curved in a partial cylindrical or semi-cylindrical manner to bear against the cable. In this case, it is also possible for the radius to be chosen such that it corresponds to the radius of the cable. Thus, in terms of the size of the radius of the outer sheath of the cable, the cable holder in question is designed to approximate the radius. As a result, a particularly efficient and space-saving arrangement and fixing to the cable can be achieved.

It is further advantageous if the receiving body also has a partially cylindrical shell-shaped or semi-cylindrical shell-shaped form. Further preferably, this forms a common curved contact surface with the fastening portion.

For this purpose, it is advantageously possible for the fastening portion to have a partially cylindrical shell-shaped or semi-cylindrical shell-shaped form. It has a contact surface that is curved in a partially cylindrical shell-shaped or semi-cylindrical shell-shaped manner to bear against the cable.

In a further advantageous embodiment of the disclosure, it is possible for the fastening portion to have a fixing element on the upper side facing away from the contact surface. It is bent in an L-shaped manner. It axially fixes the cable holder to an external fastening device (such as a cable tie). It would also be conceivable for a cable tie to be formed directly, integrally and/or in one piece, on the cable holder.

It is also advantageous if the receiving chambers includes a first and second chamber portion. The first chamber portion has a first diameter to receive a non-stripped region of a core end. The second chamber portion, that adjoins the first chamber portion, and has a smaller diameter, than the first chamber portion, to receive a stripped region of the core end. An embodiment is also conceivable where the second region, having the smaller diameter, corresponds to the outer diameter of a non-stripped core. The core is inserted with its sheath in a clamping manner into the region.

A stepped chamber is also conceivable. Thus, the chamber would have a successively reduced diameter. It has cylindrical portions lying substantially in series one behind the other. Thus, cores with different diameters can be accommodated in a clamping manner.

In a further alternative embodiment of the disclosure, the receiving chambers have, on the insertion side, an elastically deformable retaining lip or clamping teeth to hold a core sheath of a core inserted in the receiving chamber in a clamping manner or clamping elements. As a result, unintentional slipping of the folded cores out of the receiving chambers can be prevented in a further improved manner.

A further aspect of the present disclosure relates to a method for storing unused cores of a multicore cable, comprising the steps of:
  a. removing the cable sheath of a cable at an end-face stripping region and exposing the core ends of the cable cores;
  b. attaching a cable holder, as described, using a fastening device to the cable sheath of the cable immediately next to the stripping region; and
  c. folding back at least one exposed unused core by approximately 180° and inserting the core end of the core through an insertion opening into a contact chamber of the receiving body.

In this case, it is advantageous if a cable tie is used as the fastening device. The cable tie is fastened around the cable in the region of the fastening portion. It is positioned around the fastening portion in such a way that the cable holder is fixed to the cable.

Other advantageous developments of the disclosure are characterized in the dependent claims and are shown in greater detail below together with the description of the preferred embodiment of the disclosure with reference to the figures.

DRAWINGS

Further features and advantages of the disclosure result from the following description of exemplary embodiments with reference to the appended drawings. The following is shown:

DETAILED DESCRIPTION

The disclosure is described below in more detail with reference to FIGS. 1 to 3. The same reference signs indicate the same structural and/or functional features.

Figure 1:
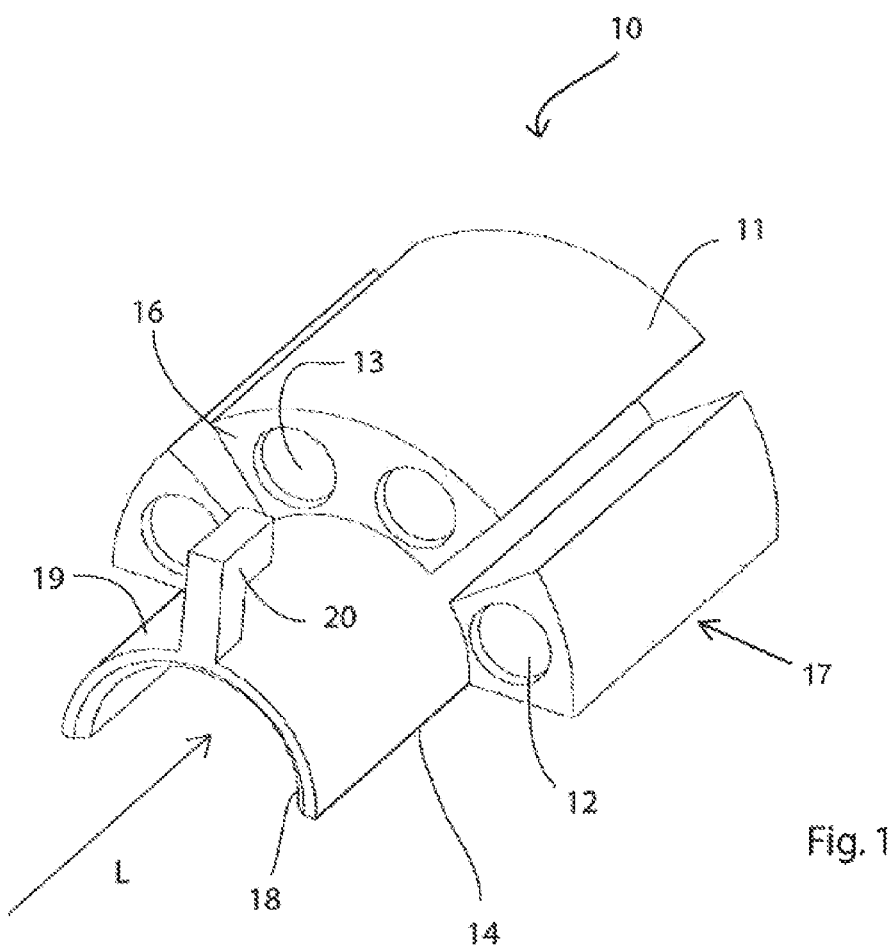
FIG. 1 is a perspective view of an exemplary embodiment of a cable holder.

FIG. 1 shows a perspective view of an exemplary embodiment of a cable holder 10. The cable holder 10 is designed to be attached to a cable 1 with a plurality of cores 2. This is shown schematically in the view of FIG. 3, by way of an example. The cable holder 10 includes a receiving body 11 with a plurality of receiving chambers 12. The chambers 12 extend in a cable longitudinal direction L.

In this embodiment, the receiving chambers 12 each have insertion openings 13, on the one end face portion 16, for inserting an end of a core 2. The cores 2 are folded back by approximately 180° in the region without the cable sheath. The cores 2 are inserted in a clamping manner in the insertion openings 13 and stored.

A fastening portion 14 projects from the receiving chamber 12. The fastening portion 14 is curved in the cable direction of longitudinal of extension L. The fastening portion 14 is designed to fasten the cable holder 10 to the outer sheath of the cable 1. A fastening device 3, such as a cable tie, engages around the cable 1 to secure the holder 10 to the cable 1.

As can be clearly seen in FIG. 1, the receiving body 11 has a semi-cylindrical or semi-cylindrical shell-shaped form. It includes a semi-cylindrically curved contact surface 17, on the side facing the cable, for bearing against the cable 1.

In the same way, the fastening portion 14 has a semi-cylindrical shell-shaped form with a semi-cylindrically curved contact surface 18. The contact surface 18 bears against the cable 1. The fastening portion 14 has, on its upper side 19 facing away from the contact surface 18, a fixing element 20. The fixing element 20 is bent in an L-shaped manner. The fixing element 20 axially fixes the cable holder 10 to the cable tie 3. The fixing element 20 prevents slipping in the axial direction. Also, it secures the cable tie 3 against slipping from the fastening portion 14.

Figure 2:
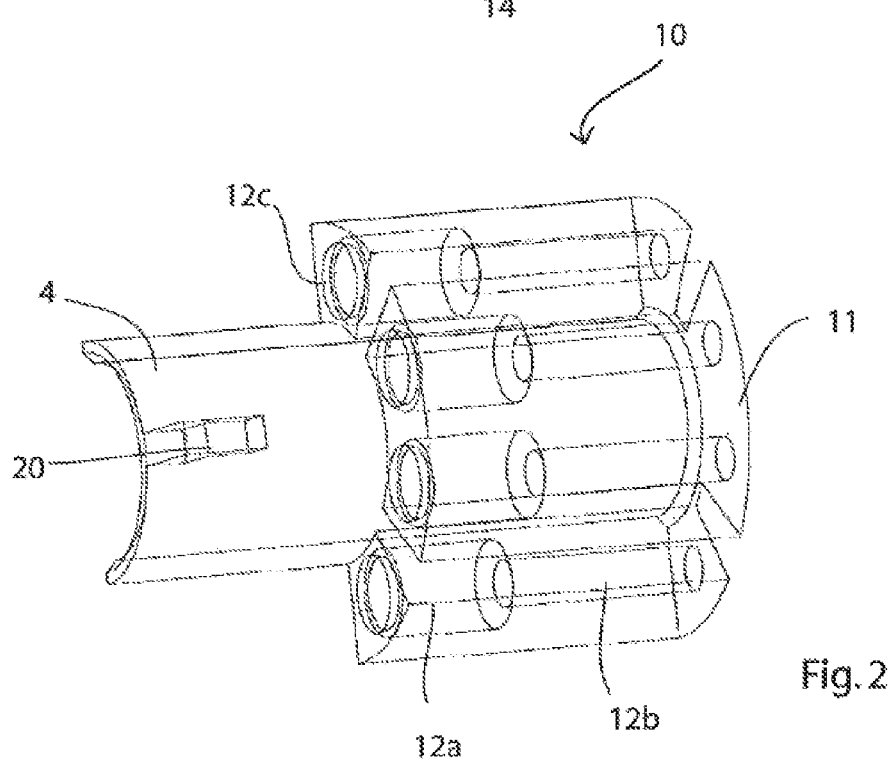
FIG. 2 is a partially transparent view of the cable holder from FIG. 1.
Figure 3:
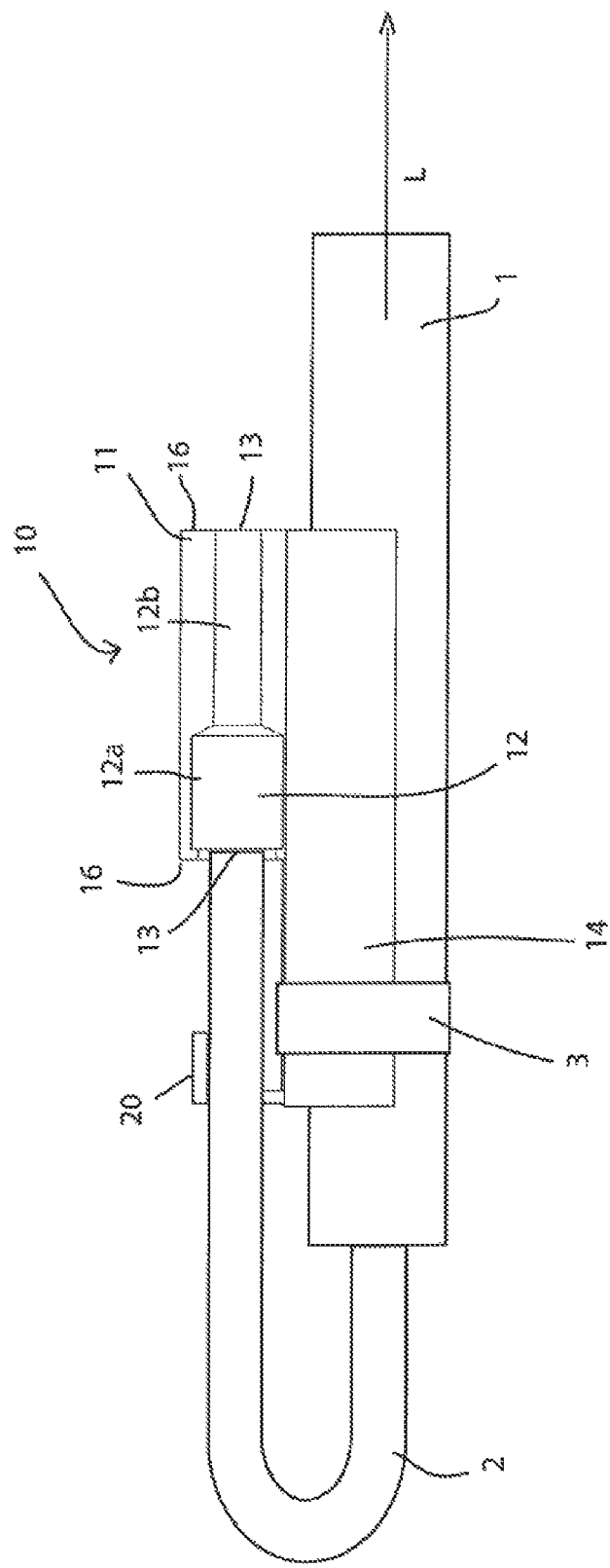
FIG. 3 is a partial side sectional view through the cable holder from FIG. 1, that has been attached to a cable.

As can be seen in the partially transparent view of FIG. 2 and in FIG. 3, the receiving chambers 12 include a first chamber portion 12a and a second chamber portion 12b. The first chamber portion 12a has a first diameter. The second chamber portion 12b adjoins the first chamber section 12a. The second chamber portion 12b has a smaller diameter than the first chamber portion 12a. On the insertion side, in this exemplary embodiment, the receiving chambers 12 are formed with an elastically deformable retaining lip 12c. The lip 12c holds a core sheath of a core 2 in a clamping manner.

The disclosure is not limited in its design to the preferred exemplary embodiments specified above. Rather, a number of variants are conceivable that make use of the solution shown, even in fundamentally different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cable holder for attaching to a cable having a plurality of cores, the cable holder comprising:
  a receiving body having a plurality of receiving chambers, the chambers extend in a cable direction of longitudinal extension;
  an insertion opening is at least on one side of each chamber for inserting an end of a core;
  a fastening portion connected to the receiving body, the fastening portion fastening the cable holder to the outer sheath of the cable by a fastening device that engages around the cable; and
  the receiving chambers include a first chamber section with a first diameter for receiving a non-stripped region of a core end and a second chamber portion adjoining and substantially colinear with the first chamber portion, the second chamber portion has a smaller diameter than the first chamber portion for receiving a stripped region of the core end.

2. The cable holder according to claim 1, wherein the fastening portion extends away from the receiving body in the cable longitudinal direction.

3. The cable holder according to claim 1, wherein the insertion opening is disposed on an end face portion of the receiving body facing in the direction of the fastening portion.

4. The cable holder according to claim 1, wherein the receiving body has, on the side facing the cable, a contact surface, that is curved in a partially cylindrical or semi-cylindrical manner, the contact surface bears against the cable.

5. The cable holder according to claim 1, wherein the receiving body a partially cylindrical shell-shaped or semi-cylindrical shell-shaped form.

6. The cable holder according to claim 1, wherein the fastening portion has a partially cylindrical shell-shaped or semi-cylindrical shell-shaped form with a contact surface that is curved in a partially cylindrical shell-shaped or semi-cylindrical shell-shaped manner to bear against the cable.

7. The cable holder according to claim 1, wherein the fastening portion has, on an upper side facing away from the contact surface, a fixing element bent in a preferably L-shaped manner for axially fixing the cable holder to the fastening device.

8. The cable holder according to claim 1, wherein the receiving chambers have, on the insertion side, an elastically deformable retaining lip or clamping teeth for holding a core sheath of a core inserted into the receiving chamber in a clamping manner.

9. A method for storing unused cores of a multi-wire cable, comprising the steps of:
   a. removing a cable sheath of a cable at a stripping region;
   b. attaching a cable holder according to claim 1, using a fastening device, to the cable sheath of the cable directly next to the stripping region;
   c. folding back at least one unused core by approximately 180°; and
   d. inserting the core end of the core through an insertion opening into a contact chamber of the receiving bodies.

10. The method according to claim 9, wherein a cable tie is used as the fastening device, the cable tie fastened in the region of the fastening portion around the cable and the fastening portion such that the cable holder is fixed to the cable.

* * * * *